(12) United States Patent
Hoban et al.

(10) Patent No.: US 8,978,007 B2
(45) Date of Patent: Mar. 10, 2015

(54) STATIC METADATA IN DYNAMIC PROGRAMS

(75) Inventors: Lucas J. Hoban, Seattle, WA (US);
Mark B. Shields, Seattle, WA (US);
Steven E. Lucco, Bellevue, WA (US);
Charles P. Jazdzewski, Redmond, WA (US); Anders Hejlsberg, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 680 days.

(21) Appl. No.: 13/173,960

(22) Filed: Jun. 30, 2011

(65) Prior Publication Data

US 2013/0007702 A1    Jan. 3, 2013

(51) Int. Cl.
*G06F 9/44* (2006.01)
*G06F 9/45* (2006.01)
*G06F 9/455* (2006.01)

(52) U.S. Cl.
CPC ................ *G06F 9/45516* (2013.01)
USPC ............ 717/114; 717/100; 717/137; 717/141

(58) Field of Classification Search
CPC ............... G06F 8/20; G06F 8/31; G06F 8/51; G06F 8/443
See application file for complete search history.

(56) References Cited

U.S. PATENT DOCUMENTS

| | | | |
|---|---|---|---|
| 7,168,063 B2 | 1/2007 | Meijer | |
| 7,543,267 B2 * | 6/2009 | Lindhorst et al. | 717/105 |
| 7,607,085 B1 * | 10/2009 | Lassesen | 715/264 |
| 7,716,246 B2 | 5/2010 | Pepin | |
| 7,743,363 B2 | 6/2010 | Brumme et al. | |
| 8,171,453 B2 * | 5/2012 | Meijer et al. | 717/114 |
| 8,627,281 B2 * | 1/2014 | Tatsubori | 717/114 |
| 2005/0262434 A1 * | 11/2005 | Soderberg et al. | 715/513 |
| 2006/0129599 A1 | 6/2006 | Hammerich | |
| 2008/0189683 A1 * | 8/2008 | Payette et al. | 717/114 |
| 2009/0024986 A1 * | 1/2009 | Meijer et al. | 717/137 |
| 2009/0132998 A1 * | 5/2009 | Meijer et al. | 717/124 |
| 2009/0288067 A1 | 11/2009 | Nathan et al. | |
| 2009/0319554 A1 | 12/2009 | Krishnaswamy et al. | |
| 2010/0131951 A1 * | 5/2010 | Carteri et al. | 718/100 |
| 2010/0299658 A1 | 11/2010 | Ng et al. | |
| 2014/0053142 A1 * | 2/2014 | Fanning et al. | 717/141 |
| 2014/0068544 A1 * | 3/2014 | Fanning et al. | 717/100 |

OTHER PUBLICATIONS

Lebresne et al., Understanding the dynamics of JavaScript, Jul. 2009, 4 pages.*

Beck et al., NXTalk: dynamic object-oriented programming in a constrained environment, Aug. 2009, 12 pages.*

(Continued)

*Primary Examiner* — Thuy Dao
(74) *Attorney, Agent, or Firm* — Kevin Sullivan; Aaron Hoff; Micky Minhas

(57) ABSTRACT

A dynamic programming environment includes a dynamic runtime infrastructure configured to receive static metadata as source text in a source code written in a dynamic programming language. The dynamic runtime infrastructure determines an object representation based on the static metadata from the source text in the source code.

17 Claims, 3 Drawing Sheets

(56) References Cited

OTHER PUBLICATIONS

Foote, et al., "Metadata and Active Object-Models," Retrieved at <<http://hillside.net/plop/plop98/final_submissions/P59.pdf>>, Department of Computer Science, University of Illinois at Urbana-Champaign, Jul. 29, 1998, pp. 24.

Haupt, et al., "Type Harvesting," Retrieved at <<http://www.hpi.uni-potsdam.de/hirschfeld/publications/media/HauptPerscheidHirschfeld_2011_TypeHarvestingAPracticalApproachToObtainingTypingInformationInDynamicProgrammingLanguages_AcmDL.pdf>>, the 2011 ACM Symposium on Applied Computing, Mar. 21-24, 2011, pp. 1282-1289.

\* cited by examiner

STATIC METADATA IN DYNAMIC PROGRAMS

BACKGROUND

Dynamic programming environments provide developers with convenient and flexible techniques in authoring programs (e.g., heterogeneous use of types, extreme polymorphism, duck typing, and prototypal inheritance). Runtime infrastructures for dynamic programming environments run scripts to provide the fastest possible execution of common programs, and use various combinations of techniques and strategies to accomplish convenience and flexibility.

While these techniques and strategies employed in implementations of runtime infrastructures for dynamic programming environments can provide potential convenience and flexibility, the corresponding potential representations of objects that can be employed in the dynamic programming environment are typically highly non-optimal and it can be extremely difficult to discover the best object representations. The highly non-optimal object representations can be a significant factor that can cause dynamic programming environments to be up to ten times slower than equivalent static environments. Even when developers use dynamic object representations in constrained ways that can potentially be represented more optimally, the runtime does not immediately recognize the constrained object representation. Instead, techniques such as tracing and profile-guided-optimization are typically used to discover how objects are being utilized and adjust code generation. However, these techniques employ heuristics and take time to recognize patterns before speed-ups are recognized. These dynamic programming environment problems are specifically notable with ECMAScript-based dynamic languages.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to a dynamic programming environment including a dynamic runtime infrastructure. The dynamic runtime infrastructure receives embedded static metadata as source text in a source code written in a dynamic programming language and recovers a description defined by the static metadata. The dynamic runtime infrastructure determines an initial optimized object representation based on the description defined by the static metadata. The dynamic runtime infrastructure backs off the initial optimized object representation if constraints of the description defined by the static metadata are violated.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
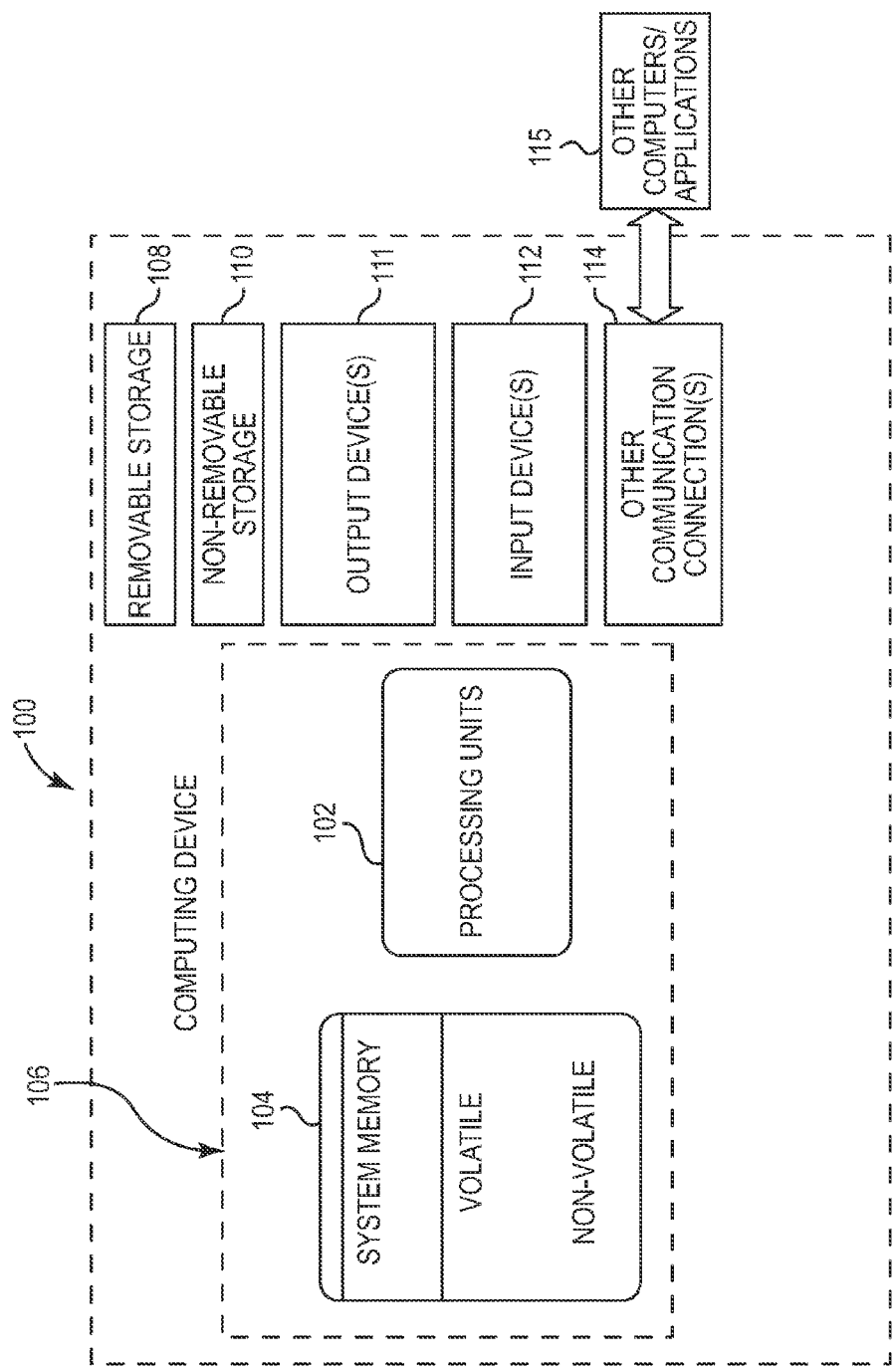
FIG. 1 is a block diagram illustrating an example computing device that can implement a dynamic programming environment.

FIG. 1 illustrates an exemplary computer system that can be employed as an operating environment that includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment. The managed environment typically includes a virtual machine that allows the software applications to run in the managed environment so that the developers need not consider the capabilities of the specific processors 102. Particular current examples of managed environment frameworks include that sold under the trade designation of Microsoft .NET Framework from Microsoft Corp. of Redmond, Wash., United States, and JAVA from Sun Microsystems, Inc. of Santa Clara, Calif., United States, as well as others.

To enable the runtime environment to provide service to the managed code, language compilers emit metadata that describes, among other things, the types in the code. A "data type," or "type system," is generally a tractable syntactic framework for classifying phrases according to the kinds of values they compute. Many programming languages explicitly include the notion of "data types" and "type systems" although different languages may include different terminology to describe these features. A data type is an attribute of corresponding data that describes some features about the data. For example, data types are used to define data as memory addresses, instruction code, integers, floating point numbers, strings, and other forms of data used in a given language and other features, such as legal values for the data and allowable operations on the values. A data type is metadata for the corresponding data. A type gives meaning to data because hardware of the computing device 100 does not make a distinction between memory addresses, instruction code, integers, floating point numbers, and the like.

The computing device 100 can be coupled to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Figure 2:
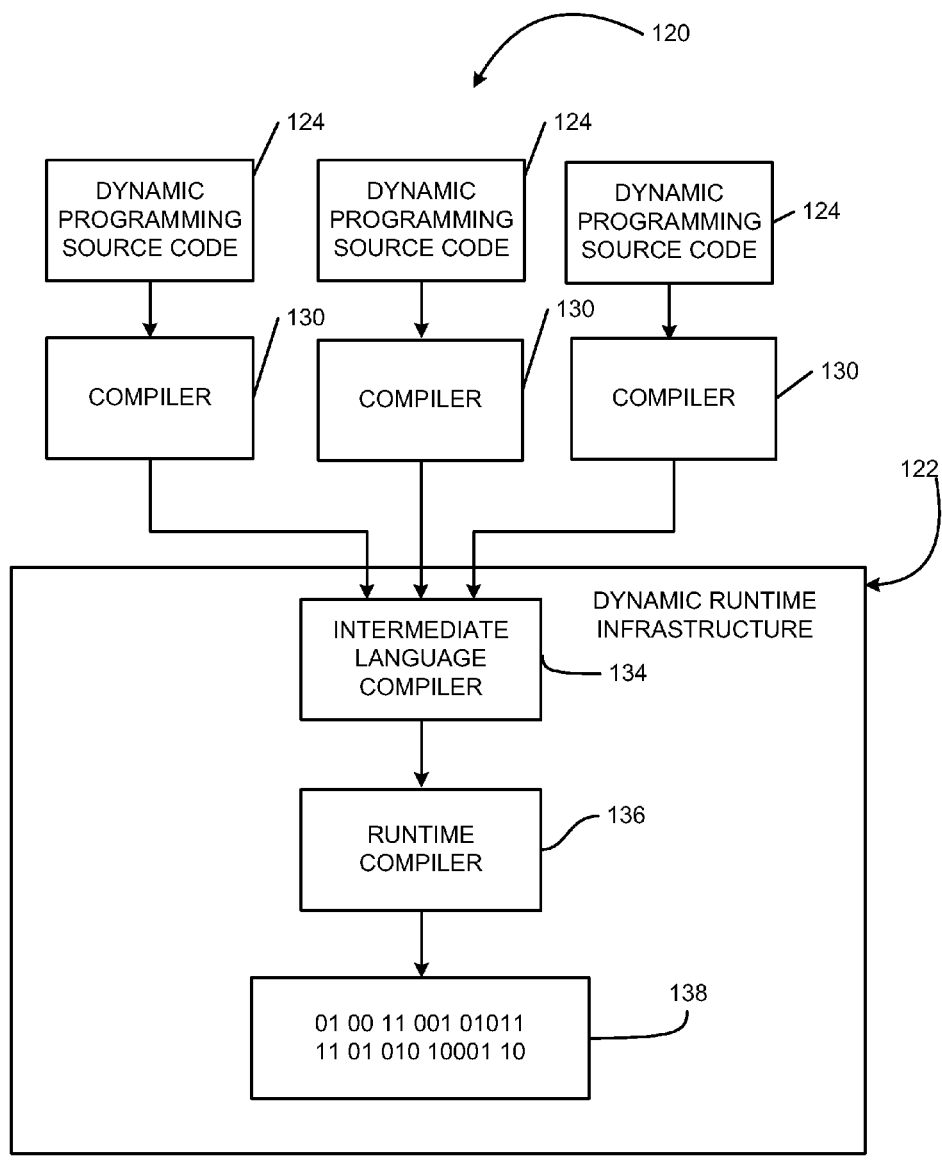
FIG. 2 is a block diagram illustrating an example embodiment of a dynamic programming environment.

FIG. 2 illustrates an example embodiment of a dynamic programming environment 120 suitable for operation with a computing device, such as the computing device 100. Dynamic programming environment 120 includes a dynamic runtime infrastructure 122 for one or more dynamic programming languages.

Dynamic programming environment 120 is configured to accept programs written in a compatible source code 124 of one or more dynamic programming languages. One or more compilers 130 in dynamic programming environment 120 are configured to compile each dynamic programming source code 124 into a corresponding compatible object code. The object code is provided to dynamic runtime infrastructure 122 that describes an executable code and a dynamic runtime environment that describes a number of dynamic runtimes. Dynamic runtime infrastructure 122 includes a second compiler 134 that receives the compatible object code and compiles the object code to a second and platform-neutral intermediate language. The intermediate language is provided to a runtime compiler 136, that compiles the intermediate language into a machine readable code 138 that can be executed on the current platform or computing device, such as computing device 100.

Dynamic programming source code 124 includes static metadata related to objects defined in dynamic language source text and is provided via objects passed to functions potentially recognized in dynamic runtime infrastructure 122. In one embodiment, these functions can be defined to have no semantics (i.e, no behavior, other than performance, of the application controlled by the dynamic code will change). Yet, if these functions are understood by dynamic runtime infrastructure 122, these functions can be treated as intrinsics by dynamic runtime infrastructure 122. If these functions are not understood by a particular dynamic runtime infrastructure, the particular dynamic runtime infrastructure can ignore these functions.

When understood, the static metadata related to objects indicate information about the type system associated with the given objects, which dynamic runtime infrastructure 122 employs to construct a partially typed model for dynamic programming source code 124. The partially typed model for dynamic programming source code 124 can then establish an initial optimistic representation of the objects to optimize for dynamic runtime behavior that adheres to the provided static metadata. When the dynamic runtime behavior violates the static metadata, dynamic runtime infrastructure 122 can continue to run as expected with reduced performance, or may choose to back off the initial optimistic representation and indicate violation of static metadata.

Figure 3:
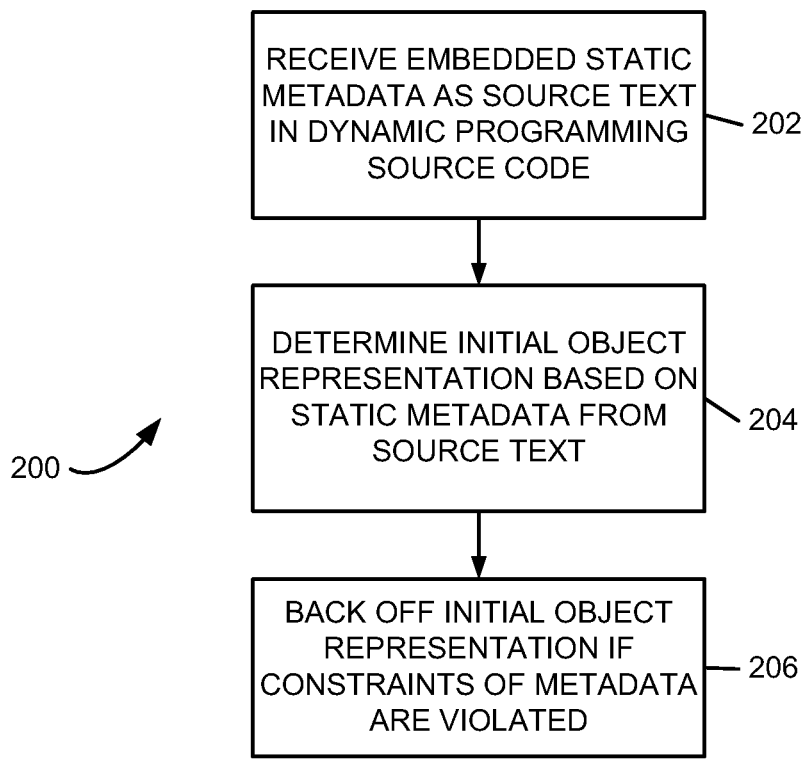
FIG. 3 is a flow diagram illustrating an example embodiment of a method implemented in a dynamic runtime infrastructure that employs static metadata from dynamic programming source code.

FIG. 3 illustrates an example embodiment of a method 200 implemented in a dynamic runtime infrastructure (e.g., dynamic runtime infrastructure 122) of a dynamic programming environment (e.g., dynamic programming environment 120). At 202, the dynamic runtime infrastructure receives embedded static metadata as source text in dynamic programming source code (e.g., dynamic programming source code 124) written in a dynamic programming language. In one embodiment, the static metadata is embedded in the dynamic programming source code manually. In one embodiment, the static metadata is embedded in the dynamic programming source code with a compiler that compiles some statically typed language into a static metadata description. At 204, the dynamic runtime infrastructure determines an initial object representation based on the static metadata from the source text in the dynamic programming source code. At 206, the dynamic runtime infrastructure backs off the initial object representation if constraints of a description defined by the static metadata are violated.

In one embodiment, the dynamic runtime infrastructure includes a mechanism configured to recover a description defined by the static metadata from source text and provide an initial optimistic object representation. This optimistic object representation can provide an optimized layout of the dynamic code in the dynamic runtime infrastructure and provide significantly faster dynamic code performance. In situations where the dynamic runtime infrastructure backs off the initial optimistic object representation if constraints of the static metadata are violated, the backed off object representation provides a less optimal layout of the dynamic code in the dynamic runtime infrastructure and not as fast dynamic code performance. In one embodiment, if the static metadata is not understood by a particular dynamic runtime infrastructure, the particular dynamic runtime infrastructure can ignore the static metadata and execute the dynamic programming source code without errors. In one embodiment, the dynamic runtime infrastructure is provided with only partial static metadata from the source text, and still provides an initial optimistic object representation that can still provide an optimized layout of the dynamic code in the dynamic runtime infrastructure and provide faster dynamic code performance for groups of components.

Method 200 and dynamic programming environment 120 can operate with no new syntax or semantics added to an existing dynamic programming language. In one embodiment, dynamic runtime infrastructure 122 is configured to recognize calls to a set of intrinsic functions, which define a representation associated with an object or constructor function defined by the embedded static metadata in the source text of dynamic programming source code 124. Dynamic runtime infrastructure 122 employs this static metadata to optimistically choose representations for the object or objects constructed from the constructor function.

Embodiments of dynamic runtime infrastructure 122 can recognize static metadata in dynamic programming source code 124 that can describe, for example, the following: types (e.g., int, double, bool, string, regexp, exception, any, etc); functions and actions; records containing at least certain fields; arrays of a specific type; constructors, including a shape of a constructed object (e.g., supertype, static properties, mutable static properties, prototype properties, mutable prototype properties, instance properties, constant instance properties); factory functions; and enumerations.

Software developers can optionally embed this static metadata into source text of dynamic programming source code. In one embodiment, static or dynamic high-level programming languages can be used to emit this static metadata automatically based on static metadata known in the high-level programming language (e.g., explicit type annotations or type inference in statically typed source languages).

In one embodiment of dynamic programming environment 120, as long as execution adheres to the constraints of the static metadata description, dynamic runtime infrastructure 122 can provide optimized code paths for the optimistic object representation. In one embodiment, dynamic runtime infrastructure 122 detects when the constraints of the static metadata description are violated, and falls back on a more naïve and permissive object representation.

The following is an example embodiment of a static metadata description in source text of dynamic programming source code 124 indicating that "Constraint" depends on "Strength" and has associated instance state "strength" of type "Strength", and three associated prototype members of the provided types.

```
PBCtor(Constraint, Strength,
    { instance: { strength: Strength },
        prototype: { addConstraint : PBAction( ),
            satisfy: PBFunc(PBInt, Constraint),
            chooseMethod: PBAction(PBInt) } });
```

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a computing device, the method comprising:
   recovering a description defined by embedded static metadata in source text in a dynamic programming source code written in a dynamic programming language, the description defined by the static metadata providing no semantic meaning when executing the dynamic programming source code;
   determining an initial optimized object representation based on the description defined by the static metadata; and
   backing off the initial optimized object representation if constraints of the description defined by the static metadata are violated.

2. The method of claim 1 comprising:
   ignoring the static metadata if the static metadata is not understood by a dynamic runtime infrastructure operating on the computing device.

3. A computer readable storage memory storing computer-executable instructions for controlling a computing device to perform a method comprising:
   receiving static metadata as source text in a dynamic programming source code written in a dynamic programming language;
   determining a first object representation based on the static metadata from the source text in the dynamic programming source code;
   recovering a description defined by the static metadata from the source text in the dynamic programming source code; and
   backing off the first object representation if constraints of the description defined by the static metadata are violated.

4. The computer readable storage memory of claim 3, wherein the static metadata is defined to provide no semantics which would control a behavior, other than performance, of an application controlled by the dynamic programming source code.

5. The computer readable storage memory of claim 3, wherein the computer-executable instructions define a dynamic runtime infrastructure and the method comprises:
   ignoring the static metadata if the static metadata is not understood by the dynamic runtime infrastructure.

6. The computer readable storage memory of claim 3, wherein the method comprises:
   recognizing calls to a set of intrinsic functions which define the first object representation based on the static metadata from the source text in the dynamic programming source code.

7. The computer readable storage memory of claim 1, wherein the method comprises:
   recognizing the static metadata from the source text in the dynamic programming source code that can describe types.

8. The computer readable storage memory of claim 3, wherein the method comprises:
   recognizing the static metadata from the source text in the dynamic programming source code that can describe functions and actions.

9. The computer readable storage memory of claim 3, wherein the method comprises:

recognizing the static metadata from the source text in the dynamic programming source code that can describe records containing at least certain fields.

10. The computer readable storage memory of claim 3, wherein the method comprises:

recognizing the static metadata from the source text in the dynamic programming source code that can describe arrays of a specific type.

11. The computer readable storage memory of claim 3, wherein the method comprises:

recognizing the static metadata from the source text in the dynamic programming source code that can describe constructors, including a shape of a constructed object.

12. The computer readable storage memory of claim 3, wherein the method comprises:

recognizing the static metadata from the source text in the dynamic programming source code that can describe factory functions.

13. The computer readable storage memory of claim 3, wherein the method comprises:

recognizing the static metadata from the source text in the dynamic programming source code that can describe enumerations.

14. The computer readable storage memory of claim 3, wherein the determining comprises:

optimizing the first object representation based on the static metadata from the source text in the dynamic programming source code.

15. A computer readable storage memory storing a dynamic runtime infrastructure including computer-executable instructions for controlling a computing device to perform a method comprising:

receiving embedded static metadata as source text in a dynamic programming source code written in a dynamic programming language;

recovering a description defined by the static metadata from the source text in the dynamic programming source code;

determining an initial optimized object representation based on the description defined by the static metadata; and backing off the initial optimized object representation if constraints of the description defined by the static metadata are violated.

16. The computer readable storage memory of claim 15, wherein the static metadata is defined to provide no semantics which would control a behavior, other than performance, of an application controlled by the dynamic programming source code.

17. The computer readable storage memory of claim 15, wherein the method comprises:

ignoring the static metadata if the static metadata is not understood by the dynamic runtime infrastructure.

* * * * *